United States Patent [19]

Machonis, Jr. et al.

[11] Patent Number: 4,486,469

[45] Date of Patent: Dec. 4, 1984

[54] METHOD OF MAKING A COMPOSITE STRUCTURE

[75] Inventors: John Machonis, Jr., Schaumburg; Seymour Schmukler; Robert J. Zeitlin, both of Palatine; Mitsuzo Shida, Barrington, all of Ill.

[73] Assignee: Chemplex Company, Rolling Meadows, Ill.

[21] Appl. No.: 540,005

[22] Filed: Oct. 7, 1983

Related U.S. Application Data

[60] Division of Ser. No. 909,298, May 24, 1978, Pat. No. 4,423,117, which is a division of Ser. No. 820,611, Aug. 1, 1977, Pat. No. 4,298,712, which is a continuation-in-part of Ser. No. 681,480, Apr. 29, 1976, abandoned.

[51] Int. Cl.³ .............................................. B05D 3/02
[52] U.S. Cl. .............................. 427/195; 156/244.11; 264/DIG. 33; 264/176 R
[58] Field of Search ................ 428/475.8, 461, 441, 428/507; 525/71, 74; 427/195; 156/244.11; 264/DIG. 33, 176 R, 219

[56] References Cited

U.S. PATENT DOCUMENTS

| | | |
|---|---|---|
| 3,658,948 | 4/1972 | McConnell ...................... 260/897 B |
| 3,856,889 | 12/1974 | McConnell ...................... 260/897 B |
| 3,868,433 | 2/1975 | Bartz ............................... 260/876 R |
| 3,873,643 | 3/1975 | Wu ................................... 260/878 R |
| 3,882,194 | 5/1975 | Krebaum ........................ 260/878 R |

Primary Examiner—Marion E. McCamish
Assistant Examiner—E. Rollins Buffalow
Attorney, Agent, or Firm—Wood, Dalton, Phillips, Mason & Rowe

[57] ABSTRACT

Compositions of matter having among other desirable characteristics strong adhesive properties to various substrates, these compositions comprising blends of a graft copolymer of a high density polyethylene and at least one unsaturated fused ring carboxylic acid anhydride blended with a polyethylene resin of one or more homopolymers of ethylene, copolymers of ethylene and alpha-olefin, ethylene-ester copolymers and one or more elastomers such as homopolymers of isobutylene, copolymers of isobutylene with isoprene, chlorinated copolymers of isobutylene and isoprene, homopolymers of isoprene, copolymers of butadiene and styrene, block copolymers of dienes and styrene where the diene is butadiene or isoprene, homopolymers of butadiene, homopolymers of chloroprene, and copolymers of acrylonitrile and butadiene.

16 Claims, No Drawings

METHOD OF MAKING A COMPOSITE STRUCTURE

CROSS-REFERENCE TO RELATED APPLICATION

This application is a division of our copending application Ser. No. 909,298 filed May 24, 1978, now U.S. Pat. No. 4,423,117 issued Dec. 27, 1983, which was a division of application Ser. No. 820,611 filed Aug. 1, 1977, now U.S. Pat. No. 4,298,712 issued Nov. 3, 1981, which is a continuation-in-part of our copending application Ser. No. 681,480, filed Apr. 29, 1976 now abandoned.

BACKGROUND OF THE INVENTION

Various polymer and resin mixtures have been proposed for adhesives with strong bonding properties for various substrates and these have been successful to varying degrees. However, the blends of this invention have remarkably superior properties when used as adhesives. Thus the object of this invention is to provide modified polyolefin resins with improved adhesion to substrates such as polar polymers, metals, glass, paper, wood, etc. These resins can be applied in any conventional manner and typical application processes are lamination, extrusion coating, coextrusion, powder coating, blow molding, etc.

It is well known that laminates of polyolefins with dissimilar substrates have many desirable characteristics. However, it is often difficult to adhere polyolefins to dissimilar substrates because of differences in physical and chemical structure. To overcome bonding difficulties, either an adhesive layer is required between the polyolefin and the substrates or the conventional polyolefin is replaced by a more expensive highly polar copolymer of the polyolefin such as an ionomer resin. Although the ionomer resin may show good adhesion, the bond formed is easily weakened by exposure to moisture or common solvents.

Another method for improving adhesion is to treat the surface of the polyolefin by corona. The bond so formed initially results in improved adhesion to polar substrates but is weakened by exposure to moisture.

Still another method for improving adhesion is to graft polar functional groups onto the polyolefin backbone chain. The most common graft copolymers are acrylic acid or maleic anhydride grafted onto polypropylene or polyethylene as described or reference in U.S. Pat. Nos. 3,658,948; 3,856,889 and 3,868,433. These graft copolymers when applied as in this invention do not give the adhesive power of the products of this invention.

SUMMARY OF THE INVENTION

By grafting suitable unsaturated fused ring carboxylic acid anhydrides to a high density polyethylene and blending the resultant graft copolymer with mixtures of elastomers comprising homopolymers of isobutylene, copolymers of isobutylene with isoprene, chlorinated copolymers of isobutylene and isoprene, homopolymers of isoprene, copolymers of butadiene and styrene, block copolymers of dienes and styrene where the diene is butadiene or isoprene, homopolymers of butadiene, homopolymers of chloroprene, copolymers of acrylonitrile and butadiene, blends of any or all of these with a polyethylene resin selected from the class consisting of homopolymers of ethylene, ethylene-ester copolymers and copolymers of ethylene and alpha-olefin and mixtures thereof, we have obtained composites with excellent adhesive strength to various substrates including polar polymers, metals, glass, paper, wood and the like. These composites also have exceptional heat sealability.

Surprisingly, the adhesive strength of the blends is synergistic in that it is better than that of any component when tested alone. Furthermore, the adhesive bond formed is not easily affected by moisture or alcohol. The adhesive bond formed is considerably enhanced when an elastomer is part of the mixture.

The blends of this invention have improvements over previous systems of which applicants are aware and these improvements include: eliminating the need for additional adhesive layers when bonding unmodified polyolefins to dissimilar substrates; economic advantages due to eliminating the need to use costly, highly polar copolymers of olefins; excellent bond strength; and moisture aand solvent insensitivity of the adhesive bond between the blends of this invention and various substrates.

DESCRIPTION OF THE PREFERRED EMBODIMENTS

The term "high density polyethylene" used herein for the grafting backbone includes polymers of ethylene and copolymers with propylene, butene and other unsaturated aliphatic hydrocarbons. These high density polyethylenes and copolymers are prepared usually using transitional metal catalysts and are also often referred to as low or medium pressure polyethylenes as opposed to low density polyethylene which often involves high pressure and free radical initiators. Preferably, such high density polyethylene has a density of about 0.930–0.970 and more preferably about 0.940–0.970. Also, it is preferable sometimes to graft to blends of two or more of the above homopolymers and copolymers.

The term "polyolefin" or "polyethylene" used herein for the blending resin includes ethylene polymers and copolymers of ethylene with propylene, butene and other unsaturated aliphatic hydrocarbons. Especially preferable in this invention are ethylene homopolymers prepared by either the low or high pressure methods (linear or high density polyethylenes and branched or low density polyethylenes, respectively) and such copolymers of ethylene with up to 40 weight percent of such higher olefins as propylene, 1-butene and 1-hexene. It is preferable sometimes to use blends of two or more of the above homopolymers and copolymers as the blending resin.

Also ethylene-ester copolymers are useful as the blending resin. By ethylene-ester copolymers it is meant copolymers of ethylene with ethylenically unsaturated monomers which contain an ester grouping. The major classes of these monomers are the vinyl esters, acrylate esters and methacrylate esters. Such esters have the general formulae:

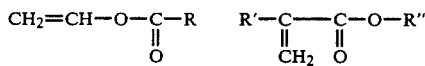

where R, R' and R" are organic radicals or hydrogen.

Preferred are vinyl esters in which R is a hydrocarbon radical containing 1–30 carbon atoms. Representatives of this class are vinyl acetate, vinyl propionate, vinyl butyrate, vinyl-2-ethylhexanoate, vinyl laurate and vinyl stearate. Also preferred are acrylate esters in which R' is hydrogen and R" is a hydrocarbon radical containing 1-30 carbon atoms. Representatives of this class are methyl acrylate, ethyl acrylate, propyl acrylate, butyl acrylate, 2-ethylhexyl acrylate, lauryl acrylate and stearyl acrylate. Further examples of preferred esters are methacrylate esters in which R' is methyl and R" is a hydrocarbon radical containing 1-30 carbon atoms such as methyl methacrylate, ethyl methacrylate, propyl methacrylate, butyl methacrylate, 2-ethylhexyl methacrylate, lauryl methacrylate and stearyl methacrylate. Other preferred esters are alkyl itaconates where R' is

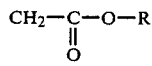

(where R is a hydrocarbon radical containing 1-30 carbon atoms) and R" is a hydrocarbon radical containing 1-30 carbon atoms such as dimethyl itaconate, diethyl itaconate and dibutyl itaconate. Especially preferred ethylene-ester copolymers are ethylene vinyl acetate copolymers.

Also the blends of this invention contain one or more elastomers. By elastomer is meant homopolymers of isobutylene, copolymers of isobutylene, homopolymers of chloroprene, copolymers of a diene and a vinyl aromatic compound, block copolymers of a diene and vinyl aromatic compound, copolymers of hydrogenated diene and vinyl aromatic compound, copolymers of hydrogenated block copolymers of a diene and vinyl aromatic compound, homopolymers of butadiene, and copolymers of an ethylenically unsaturated nitrile and a diene.

Some examples of these elastomers are copolymers of isobutylene with isoprene, chlorinated copolymers of isobutylene and isoprene, copolymers of butadiene and styrene, copolymers of isoprene and styrene, copolymers of butadiene and vinyl toluene, block copolymers of butadiene and styrene, block copolymers of butadiene and vinyl toluene, block copolymers of isoprene and styrene, block copolymers of isoprene and vinyl toluene, hydrogenated copolymers of butadiene and styrene, hydrogenated block copolymers of isoprene and styrene, copolymers of acrylonitrile and butadiene, copolymers of methacrylonitrile and butadiene, copolymers of acrylonitrile and isoprene, and copolymers of methacrylonitrile and isoprene.

It is preferred in the invention to use homopolymers of isobutylene, chlorinated copolymers of isobutylene and isoprene, homopolymers of chloroprene and hydrogenated copolymers of styrene and isoprene.

The unsaturated fused ring carboxylic acid anhydrides used as the grafting monomers are compounds which contain one or more carbocyclic, acyclic, polycyclic and/or heterocyclic moieties not including the anhydride ring.

Fused ring is defined in the "International Encyclopedia of Chemical Science", D. Van Nostrand Co., Inc., Princeton, N.J., 1964 as "a structural element in the formula of a chemical compound consisting of two rings that are joined by having two atoms in common".

The compounds may be simple, bridged, carbocyclic, heterocyclic, polycyclic or complex. These compounds may contain up to 35 carbon atoms. These classes are represented respectively by the following structures which are meant to be illustrative rather than limiting:

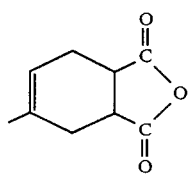

simple (acyclic moiety)
4-methylcyclohex-4-ene-1,2-dicarboxylic acid anhydride
(4-MTHPA)

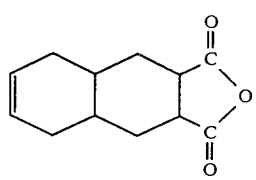

simple, carbocyclic
1,2,3,4,5,8,9,10-octahydro-naphthalene-2,3-dicarboxylic acid anhydride

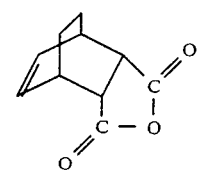

bridged, carbocyclic,
bicyclo(2.2.2)oct-5-ene-2,3-dicarboxylic acid anhydride
(BODA)

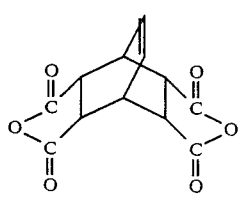

bridged, carbocyclic & complex
bicyclo(2.2.2)oct-7-ene-2,3,5,6-tetracarboxylic-2,3,5,6-dianhydride

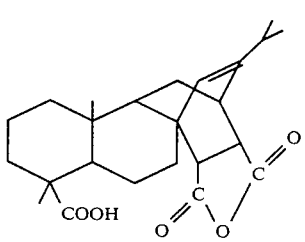

bridged, carbocyclic, polycyclic
& complex
maleo-pimaric acid
(M-PA)

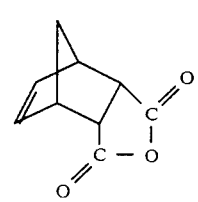

bridged, carbocyclic
bicyclo(2.2.1)hept-5-ene-2,3-dicarboxylic acid anhydride
(NBDA)

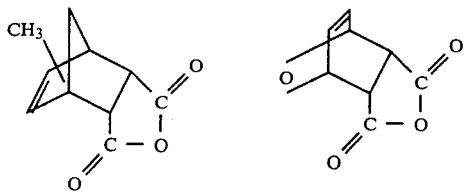

bridged, carboxylic, mixture of isomers x-methylbicyclo(2.2.1)hept-5-ene-2,3-dicarboxylic acid anhydride (XMNA)

heterocyclic and bridged 7-oxabicyclo(2.2.1)hept-5-ene-2,3-dicarboxylic acid anhydride It is often desirable in making the graft copolymers to use more than one monomer in order to control the physical properties of the final graft copolymers.

The method of making the graft copolymers of the blends of this invention consists in general of heating a mixture of the polymer or polymers and the monomer or monomers to be grafted in a solvent or above the melting point of the polyolefin with or without an initiator. Thus, the grafting occurs in the presence of air, hydroperoxides, other free radical initiators or in the essential absence of these materials where the mixture is maintained at elevated temperatures and preferably under high shear.

In making the graft copolymers used in this invention, the mixture of high density polyethylene or its copolymers and monomer or monomers is heated in a solvent or above the melting point of the polyethylene at reaction temperatures and under reacting conditions described below and thereafter the resulting graft copolymer is recovered for later blending with the polyethylene resin. The term "recovered" means any method or system which separates the graft copolymer that is produced. Thus, the term includes recovery of the copolymer in the form of precipitated fluff, pellets, powders and the like.

Any of the commonly known hydroperoxides which have a half life of at least one minute at 145° C. may be used as an initiator. Such hydroperoxides have the general formula R—O—OH wherein R is an organic radical. Among the suitable hydroperoxides are t-butyl hydroperoxide, p-menthane hydroperoxide, pinane hydroperoxide, and cumene hydroperoxide, as well as others known in the art. The elevated temperature causes rapid decomposition of the hydroperoxide which initiates the reaction between the polyolefin and monomer to form the graft copolymer.

Obviously, the more homogeneous the mixture prior to heating, the less mixing will be required of the solution or molten composition. Generally, in order to obtain a desirable conversion, it has been found that some form of mixing is highly desirable in the absence of a solvent even when a uniform mixture of all of the components of the composition is formed prior to heating. In general, when a solvent is not used, the composition should be heated to a temperature above about 130° C., and it is preferred to use the temperature ranging from about 200° C. to about 360° C. Temperatures substantially above about 360° C. are generally to be avoided in order to avoid substantial decomposition of the polymeric ingredients. The reaction time required is quite short, being of the magnitude of from a few seconds to about 20 minutes, although extended heating times do not substantially affect the product and may be employed when desired.

A convenient method of accomplishing the grafting reaction is to premix the ingredients and then extrude the composition through a heated extruder. Other mixing means, such as a Brabender mixer, a Banbury mixer, roll mills and the like may also be employed for the process. In order to prevent undue increase in molecular weight with a possibility of some crosslinking at elevated temperatures, it is desirable to carry out the reaction in a closed reaction vessel. A conventional single or multiple screw extruder accomplishes this result without the use of auxiliary equipment and for this reason is a particularly desirable reaction vessel, although it is by no means necessary.

The resulting graft copolymers used in the blends of this invention are found to consist of about 70–99.999 weight percent of high density polyethylene or copolymers and about 30–0.001 weight percent of the unsaturated fused ring carboxylic acid anhydride, especially preferred is about 0.001–5 weight percent of anhydride in the graft copolymer, and these resulting graft copolymers are capable of blending with a wide variety of polyethylene resins and elastomers to produce the adhesive compositions of this invention. The preferred range of the elastomer in the blend is about 1–35 weight percent. The preferred weight percent of the graft copolymer in the blend is about 0.1–30. The preferred range for the polyolefin blending resin is about 98.9–35 weight percent.

Excellent monomers in the graft copolymer of this invention include 4-methylcyclohex-4-ene-1,2-dicarboxylic acid anhydride, tetrahydrophthalic anhydride, x-methylnorborn-5-ene-2,3-dicarboxylic anhydride, norborn-5-ene-2,3-dicarboxylic anhydride, maleopimaric acid, and bicyclo(2.2.2)oct-5-ene-2,3-dicarboxylic anhydride.

It is preferred in this invention first to prepare a high density polyethylene in which a graft monomer is grafted in a high concentration and then the modified polyethylene can then be blended with a wide variety of non-grafted polyolefins and elastomers so that we can control not only the amount of graft copolymer in the blend but also the properties of the blends. The amount of graft copolymer in the blend is determined by the amount required to attain maximum adhesion with the substrate being used. These substrates include polar polymers, wood, metal, glass, cellophane, paper and many others.

Some of the blends were prepared in an electrically heated Brabender Plasticorder mixing head using a scroll type mixer under the following conditions: temperature=350° F., motor speed=120 rpm and mixing time=10 minutes after flux.

Other blends were prepared in a Banbury type mixer whose capacity is 35 pounds under the following conditions: drop temperature=365° F., rotor speed=115 rpm, flux time=1½ min., and mixing time after flux=2 min.

Some of the resultant blends were then compression molded into films between 0.007 inch thick to 0.010 inch thick at 350° F. The films were then pressed to the substrate under evaluation in a Pasadena Hydraulic Compression molding press having platens 8"×8". The samples to be tested were held at 400° F. for 3 minutes at 1000 psig followed by quenching in a cold Pasadena Hydraulic Press held at 4000 psig. Slip sheets were used between the blend and the substrate in order to provide a tab for subsequent testing of the composite.

The resultant composites were tested by cutting into strips of 1/16" width. The tab of the test substrate is attached to a fixed support and weights were hung in increments of 50 grams to the tab of the test film forming a 180° peel angle. Attempts were made to maintain an angle of 90° between the peel angle and the composite under test. The width of the test strips and the number of weights required to completely separate the composite were recorded. This test will be referred to as the adhesion press test (APT).

Other samples of the resultant blends were heat sealed to the substrate using a Sentinel Bar Sealer (Model 12-A) whose bar is 12 inches long and 1 inch wide. The temperature set on the heating bar varied between 450° and 475° F. The time for the heat seal varied between 0.5 seconds and 5 seconds. The pressure on the bar was 40 psi. The width of the strip tested is 1 inch.

The T-peel test described above is similar to the test described by Dickert et al in Tappi, Vol. 51, No. 6, June 1968 on page 66A except that the Tappi test used 30 gram weights and one minute elapsed before the next weight was added. The point of failure in our test is the actual number of weights put on the sample rather than subtracting ½ of the last weight as described by Dickert et al.

The procedure herein described is also related to ASTM D-1876-72 T-peel strength of adhesives with the following differences:

1. A motor driven instrument is used in ASTM D 1876-72 and the test panel is 12 inches long by 6 inches wide. The first 3 inches of length are bent back to form a 90° bend.
2. The separation rate of the bond is 5 inches per minute.
3. The strip width is 1 inch.
4. The peel strength is determined from the autographic curve for the first 5 inches of peeling after the initial peak.
5. The average peeling load in pounds per inch of the specimen width required to separate the adherends is reported.

The heat seal test described herein is similar to ASTM F-88-68, Method A, Seal Strength of Flexible Barrier Materials except that the tab of the seal was held at a 180° angle and attempts were made to maintain an angle of 90° between the peel angle and the composite under test instead of the free angle specified. No measurement of the length of any seal separation parallel to the long dimension was made.

EXAMPLES 1-9

X-methyl bicyclo(2.2.1)hept-5-ene-2,3-dicarboxylic acid anhydride (XMNA) is reacted with high density polyethylene homopolymer resin in a twin-screw extruder to give a graft copolymer resin with 1.0 wt.% XMNA incorporation and a melt index of 0.8 gm/10 min. The above graft copolymer is blended with mixtures of polyisobutylene (Vistanex L-120, a product of Exxon) and an ethylene-hexene-1 copolymer resin whose density is 0.954 g/cc and a high load melt index of 13.0 g/10 min.

The mixture of high density polyethylene and polyisobutylene, the high density polyethylene and the polyisobutylene itself containing the graft copolymer as specified in Table I as well as the graft copolymer itself were tested for adhesion to nylon and aluminum using the procedure described for the preparation and testing of T-peel strength by APT with the following results:

TABLE I

| | Blend compositions | | | Adhesion to Aluminum No. of Wts. 1/16" strip | Adhesion to Nylon No. of Wts. 1/16" strip |
|---|---|---|---|---|---|
| Exam. No. | Graft Copolymer in Blend Wt. % | High Density Polyethylene Wt. % | Polyisobutylene Wt. % | | |
| 1 | 0 | 100 | 0 | <1 | <1 |
| 2 | 0 | 0 | 100 | <1 | <1 |
| 3 | 0 | 70 | 30 | <1 | <1 |
| 4 | 3 | 97 | 0 | 6 | 9 |
| 5 | 3 | 0 | 97 | 2 | <1 |
| 6 | 3 | 87.3 | 9.7 | 13 | CNS |
| 7 | 3 | 77.6 | 19.4 | CNS | CNS |
| 8 | 3 | 67.9 | 29.1 | CNS | CNS |
| 9 | 100 | 0 | 0 | 4 | <1 |

CNS = could not separate film from substrate

As shown by the table, surprisingly, the adhesion of the mixture containing the polyisobutylene, graft copolymer and high density polyethylene is considerably enhanced when compared to a blend of high density polyethylene and the graft copolymer, or polyisobutylene and the graft copolymer. Furthermore, the table demonstrates that high density polyethylene, polyisobutylene or mixtures of high density polyethylene and polyisobutylene do not adhere to a substrate without the addition of the graft polymer described above.

EXAMPLES 10-12

The fused ring anhydride graft copolymer described in Example 1 is blended at the 3 wt.% level into a mixture of LDPE and polyisobutylene. The graft copolymer resin was blended at the 3 wt.% level into LDPE alone and polyisobutylene alone for comparison purposes. The results are summarized below. The low density polyethylene had a melt index of 1.7 gm/10 min. and a density of 0.922 g/cc.

TABLE II

| | Blend Compositions | | | Adhesion to Aluminum (APT) No. of Wts. 1/16" strip |
|---|---|---|---|---|
| Exam. No. | Graft Copolymer Wt. % | Polyisobutylene Wt. % | Polyethylene Wt. % | |
| 10 | 3 | 0 | 97 | 7 |
| 11 | 3 | 20 | 77 | CNS |
| 12 | 3 | 97 | 0 | 2 |

The above result demonstrates the enhancement of adhesion resulting from the addition of polyisobutylene to a graft copolymer blend with low density polyethylene.

EXAMPLES 13–14

The fused ring anhydride graft copolymer resin described in Example 1 is blended at the 5 wt.% level into a mixture of 21% polyisobutylene and 74% HDPE using a Banbury mixer as described earlier. The resultant blend is blown into a tubular film 2.5 mils thick by techniques well known to the art. The film is heat sealed for 5 seconds at 450° F. to aluminum as described earlier and the results are summarized below.

TABLE III

| | Blend Compositions | | | Adhesion to |
|---|---|---|---|---|
| Exam. No. | Graft Copolymer Wt. % | Polyiso- butylene Wt. % | Poly- ethylene Wt. % | Aluminum No. of Wts. 1" strips |
| 13 | 0 | 22 | 78 | <1 |
| 14 | 5 | 21 | 74 | 32 |

This demonstrates that the heat seal bond of a polyethylene-polyisobutylene-fused ring anhydride graft copolymer blend is excellent to aluminum.

EXAMPLES 15–21

XMNA together with dibutyl maleate (DBM) are reacted with ethylene-butene-1 copolymer resin in a twin-screw extruder to give a cografted copolymer resin with 1.4 wt.% XMNA and 1.1 wt.% DBM incorporation and a melt index of 0.64 gm/10 min. The above cograft copolymer is blended at the 3 and 5 wt.% level with mixtures of high density polyethylene whose high load melt index is 13 g/10 min. and density is 0.954 and polyisobutylene. The results are summarized in the table below.

TABLE IV

| | Blend Compositions | | | Adhesion to |
|---|---|---|---|---|
| Exam. No. | Graft Copolymer Wt. % | HDPE Wt. % | Polyiso- butylene Wt. % | Aluminum (APT) No. of Wts. 1/16" strips |
| 15 | 100 | 0 | 0 | 2 |
| 16 | 0 | 100 | 0 | <1 |
| 17 | 0 | 0 | 100 | <1 |
| 18 | 3 | 77 | 20 | 12 |
| 19 | 5 | 75 | 20 | CNS |
| 20 | 3 | 67 | 30 | 15 |
| 21 | 5 | 65 | 30 | CNS |

These results demonstrate the greatly enhanced adhesion that results when the cograft copolymer containing a fused ring anhydride as one of the grafting monomers is blended into mixtures of polyisobutylene and high density polyethylene.

EXAMPLES 22–27

The fused ring anhydride graft copolymer described in Example 1 is blended at the 3 wt.% level into a mixture of 67% HDPE whose HLMI is 19.3 and density is 0.954 and 30% chlorinated "Butyl HT" rubber, a product of Exxon, whose maximum isoprene content is 3 mol percent and whose chlorine content is 1.3 wt.%. The chlorinated Butyl rubber, the mixture of chlorinated Butyl rubber and HDPE and the HDPE containing the graft copolymer were tested for adhesion to aluminum together with the HDPE alone and the chlorinated Butyl rubber alone, and the mixture of chlorinated Butyl rubber and HDPE alone with the following results.

TABLE V

| | Blend Compositions | | | Adhesion to |
|---|---|---|---|---|
| Exam. No. | Graft Copolymer Wt. % | HDPE Wt. % | Chlorinated Butyl Rubber Wt. % | Aluminum (APT) No. of Wts. 1/16" strips |
| 22 | 0 | 100 | 0 | <1 |
| 23 | 0 | 0 | 100 | 3 |
| 24 | 0 | 70 | 30 | <1 |
| 25 | 3 | 97 | 0 | 7 |
| 26 | 3 | 0 | 97 | 3 |
| 27 | 3 | 67 | 30 | CNS |

The above results demonstrate the enhancement of adhesion resulting from the addition of chlorinated Butyl rubber to a graft copolymer blend with HDPE.

EXAMPLES 28–33

The fused ring anhydride graft copolymer described in Example 1 is blended at the 3 wt.% level into a mixture of 67 wt.% HDPE whose HLMI is 19.3 and density is 0.954 and 30 wt.% Neoprene type GN (polymer of chloroprene, a product of E. I. DuPont). The HDPE, the Neoprene and the mixture of Neoprene and HDPE blends containing the graft copolymer were tested for adhesion to aluminum together with the mixture of Neoprene and HDPE alone, the HDPE along and the Neoprene alone with the following results.

TABLE VI

| | Blend Compositions | | | Adhesion to |
|---|---|---|---|---|
| Exam. No. | Graft Copolymer Wt. % | HDPE Wt. % | Neoprene Wt. % | Aluminum (APT) No. of Wts. 1/16" strips |
| 28 | 0 | 100 | 0 | <1 |
| 29 | 0 | 0 | 100 | <1 |
| 30 | 0 | 70 | 30 | <1 |
| 31 | 3 | 97 | 0 | 7 |
| 32 | 3 | 0 | 97 | <1 |
| 33 | 3 | 67 | 30 | 11 |

The above results demonstrate the enhancement of adhesion resulting from the addition of neoprene to a graft copolymer blend with HDPE.

EXAMPLES 34–38

The fused ring anhydride graft copolymer described in Example 1 is blended at the 3 wt.% level into a mixture of 67% HDPE whose HLMI is 19.3 with a density of 0.954 and 30 wt.% of a styrene-isoprene block copolymer wherein the isoprene has been completely hydrogenated, manufactured by Shell Chemical Company and sold under the trademark "Kraton G". A mixture of Kraton G and HDPE and HDPE blends containing the graft copolymer were tested for adhesion to aluminum and nylon together with the mixture of Kraton G and HDPE alone, HDPE alone and Kraton G alone with the following results:

TABLE VII

| | Blend Compositions | | | Adhesion to | |
|---|---|---|---|---|---|
| Exam. No. | Graft Copolymer Wt. % | HDPE Wt. % | Kraton G Wt. % | Aluminum No. of Wts. 1/16" strip | Nylon |
| 34 | 0 | 100 | 0 | <1 | <1 |
| 35 | 0 | 0 | 100 | 3 | <1 |
| 36 | 0 | 70 | 30 | 1 | <1 |
| 37 | 3 | 97 | 0 | 7 | 9 |

TABLE VII-continued

| Exam. No. | Blend Compositions | | | Adhesion to Aluminum Nylon No. of Wts. 1/16" strip | |
|---|---|---|---|---|---|
| | Graft Copolymer Wt. % | HDPE Wt. % | Kraton G Wt. % | | |
| 38 | 3 | 67 | 30 | 15 | 15 |

The above results demonstrate the enhancement of adhesion resulting from the addition of a block copolymer of isoprene and styrene to a graft copolymer blended with HDPE.

EXAMPLES 39-41

The fused ring anhydride graft copolymer resin described in Example 1 is blended at the 5 wt.% level into a mixture of an ethylene-vinyl acetate copolymer and polyisobutylene. The graft copolymer resin was blended at the 5 wt.% level into the ethylene-vinyl acetate copolymer (EVA) alone and polyisobutylene alone for comparison purposes. The results are summarized below. The ethylene-vinyl acetate copolymer had a melt index of 2.8 and a density of 0.93 g/cc. The vinyl acetate content of the ethylene-vinyl acetate copolymer is 8 wt.%.

TABLE IX

| Exam. No. | Blend Compositions | | | Adhesion to Aluminum (ATP) No. of Wts. 1/16" strips |
|---|---|---|---|---|
| | Graft Copolymer Wt. % | Polyisobutylene Wt. % | EVA Wt. % | |
| 39 | 5 | 0 | 95 | 9 |
| 40 | 5 | 95 | 0 | 3 |
| 41 | 5 | 30 | 65 | CNS |

The above results demonstrate that the adhesion of a blend of graft copolymer with ethylene-vinyl acetate copolymer is greatly improved by the addition of polyisobutylene to the blend.

EXAMPLES 42-44

The mixture of polyisobutylene, HDPE and fused ring anhydride graft copolymer described in Example 14 is made into blown film. The film is heat sealed for 5 seconds at 475° F. to aluminum. The resultant composite was subjected to boiling water for 10 hours. Another sample was soaked in methanol at room temperature for 240 hours. The adhesion of the bond was measured with the following results:

TABLE X

| Exam. No. | Blends Compositions | | | | | Adhesion to Aluminum No. of Wts. 1" strip |
|---|---|---|---|---|---|---|
| | Graft Copolymer Wt. % | Polyisobutylene Wt. % | Polyethylene Wt. % | Solvent | Exposure Time Hrs. | |
| 42 | 5 | 21 | 74 | None | 0 | 35 |
| 43 | 5 | 21 | 74 | Methanol 20° C. | 240 | 31 |
| 44 | 5 | 21 | 74 | Boiling Water | 10 | 31 |

The above results demonstrate that the bond to aluminum of the mixture of polyisobutylene, high density polyethylene and the fused ring anhydride graft copolymer is not adversely affected by exposure to alcohol or boiling water.

EXAMPLES 45-50

XMNA is reacted with a high density polyethylene homopolymer in a twin-screw extruder to give a graft copolymer with 1.0 wt.% XMNA incorporation. The above graft copolymer is blended with polyisobutylene and a high density polyethylene homopolymer whose melt index is 0.8 g/10 min. and whose density is 0.96 g/cc.

For comparison purposes, maleic anhydride (a non-fused ring anhydride) is reacted with a high density polyethylene homopolymer to give a maleic anhydride graft copolymer with 2.2 wt.% maleic anhydride incorporation. This graft copolymer is blended with polyisobutylene and the high density polyethylene homopolymer described above. The blends were tested for adhesion to nylon 6 film using the procedure described earlier for the APT test. The results are shown in the table below.

TABLE XI

| Exam. No. | Blend Compositions | | | | Adhesion to No. of Wts. 1/16" strip |
|---|---|---|---|---|---|
| | XMNA Graft Copolymer Wt. % | Maleic Anhydride Graft Copolymer Wt. % | Polyiso-HDPE Wt. % | Nylon 6 bytylene Wt. % | |
| 45 | 1 | 0 | 89 | 10 | 8 |
| 46 | 0 | 1 | 89 | 10 | 3 |
| 47 | 3 | 0 | 92 | 5 | CNS |
| 48 | 0 | 3 | 92 | 5 | 3 |
| 49 | 3 | 0 | 87 | 10 | CNS |
| 50 | 0 | 3 | 87 | 10 | 2 |

These examples show that despite the fact that maleic anhydride is grafted to the same backbone as is XMNA and is also blended with the same mixture of polyisobutylene and high density polyethylene, the adhesion of the blends containing maleic anhydride grafted copolymer is very poor when compared with the blends containing XMNA graft copolymer. This shows that fused ring anhydride graft copolymers are superior and not all anhydride-grafted copolymers are equivalent in producing blends for adhesion to a typical substrate.

EXAMPLES 51-55

Epolene C-16 (Eastman Kodak), a commercial maleated polyethylene, was blended with high density polyethylene homopolymer resin with a melt index of 0.2 g/10 min. and a density of 0.96 g/cc. The maleated polyethylene was also blended with a mixture of the high density polyethylene homopolymer described above and polyisobutylene.

For comparison purposes, the fused ring anhydride graft copolymer described in Example 1 was blended with polyisobutylene and the high density polyethylene homopolymer described above.

The adhesion of the blends to nylon 6 film was determined using the procedure described earlier for the preparation and testing of adhesion (APT).

TABLE XII

| Exam. No. | Blend Compositions | | | | Adhesion to Nylon 6 No. of Wts. 1/16" strip |
|---|---|---|---|---|---|
| | XMNA Graft Copolymer Wt. % | Maleated PE Wt. % | HDPE Wt. % | Polyisobutylene Wt. % | |
| 51 | 0 | 0 | 100 | 0 | <1 |
| 52 | 0 | 0 | 0 | 100 | <1 |
| 53 | 0 | 3 | 97 | 0 | <1 |
| 54 | 0 | 3 | 67 | 30 | <1 |

TABLE XII-continued

| Exam. No. | Blend Compositions | | | | Adhesion to Nylon 6 No. of Wts. 1/16" strip |
|---|---|---|---|---|---|
| | XMNA Graft Copolymer Wt. % | Maleated PE Wt. % | HDPE Wt. % | Polyisobutylene Wt. % | |
| 55 | 3 | 0 | 67 | 30 | CNS |

These results show that no improvement in the low level of adhesion occurs when polyisobutylene is added to high density polyethylene in the presence of maleated polyethylene. Whereas, the blend containing the fused ring anhydride XMNA graft copolymer is remarkably better. Unexpectedly, maleated polyethylene (an acid anhydride graft copolymer prepared by known methods in the art) is not effective in this invention.

EXAMPLES 56-59

Epolene E-43 (Eastman Kodak), a commercial maleated polypropylene, was blended with a high density polyethylene whose melt index is 0.2 g/10 min. and whose density is 0.96 g/cc. The maleated polypropylene was also blended with a mixture of polyisobutylene and the high density polyethylene described above. The adhesion of the blends to nylon 6 film was determined according to the procedure described earlier (APT) with the following results.

TABLE XIII

| Exam. No. | Blend Compositions | | | Adhesion to Nylon 6 No. of Wts. 1/16" strip |
|---|---|---|---|---|
| | Maleated Polypropylene Wt. % | HDPE Wt. % | Polyisobutylene Wt. % | |
| 56 | 0 | 100 | 0 | <1 |
| 57 | 0 | 0 | 100 | <1 |
| 58 | 3 | 97 | 0 | <1 |
| 59 | 3 | 67 | 30 | <1 |

These results show that no improvement in the very low level of adhesion is observed when polyisobutylene is added to high density polyethylene in the presence of maleated polypropylene.

Again, maleated polypropylene (an acid anhydride graft copolymer prepared by known methods in the art) is not effective in this invention.

EXAMPLES 60-65

XMNA is reacted with a low density polyethylene homopolymer in a twin-screw extruder to give a graft copolymer with 1.0 wt.% XMNA incorporation. The graft copolymer is blended with a high density polyethylene homopolymer resin whose density is 0.96 g/cc and whose melt index is 0.8 g/10 min. The same graft copolymer is blended with a mixture of the high density polyethylene described above and polyisobutylene (Vistanex L-120, a product of Exxon).

For comparison purposes, blends were prepared as above except that the high density graft copolymer of XMNA as described in Example 1 was substituted for the low density XMNA graft copolymer described above.

The blends were tested for adhesion to nylon 6 film using the procedure described earlier for the APT test. The results of these experiments are summarized below.

TABLE XIV

| Exam. No. | Blend Compositions | | | | Adhesion to Nylon 6 No. of Wts. 1/16" strip |
|---|---|---|---|---|---|
| | LDPE Based XMNA Graft Copolymer Wt. % | HDPE Based XMNA Graft Copolymer Wt. % | HDPE Wt. % | Polyisobutylene Wt. % | |
| 60 | 0 | 0 | 100 | 0 | <1 |
| 61 | 0 | 0 | 0 | 100 | <1 |
| 62 | 3 | 0 | 97 | 0 | <1 |
| 63 | 3 | 0 | 67 | 30 | 1 |
| 64 | 0 | 3 | 97 | 0 | 9 |
| 65 | 0 | 3 | 67 | 30 | CNS |

As shown by the table, surprisingly, the blends containing the high density polyethylene graft copolymer, high density polyethylene and polyisobutylene are adhesive to nylon where a similar blend containing the low density polyethylene graft copolymer is ineffective even though the grafting monomer and the resulting graft incorporation are equivalent. This example clearly indicates that the nature of the graft copolymer has to be very specific to produce effective adhesive blends in this invention. Not only does the anhydride have to be of a very specific type, i.e., fused ring, but also the polyethylene backbone must be high density.

EXAMPLES 66-70

XMNA is reacted with a low density polyethylene homopolymer in a twin-screw extruder to give a graft copolymer with 1.0 wt.% XMNA incorporation. The above graft copolymer is blended with a low density polyethylene whose melt index is 6.5 g/10 min. and whose density is 0.917 g/cc. The same graft copolymer is blended with a mixture of the low density polyethylene described above and polyisobutylene.

The adhesion to nylon 6 film, using the procedure described earlier for the preparation and testing of adhesion (APT), of low density polyethylene, polyisobutylene and the mixture of low density polyethylene with and without the low density XMNA graft copolymer was determined. For comparison purposes, the high density graft copolymer of XMNA as described in Example 1 was blended with polyisobutylene and the low density polyethylene described above. The results are shown in the table below.

TABLE XV

| Exam. No. | Blend Compositions | | | | Adhesion to Nylon 6 No. of Wts. 1/16" strip |
|---|---|---|---|---|---|
| | HDPE Based XMNA Graft Copolymer Wt. % | LDPE Based XMNA Graft Copolymer Wt. % | LDPE Wt. % | Polyisobutylene Wt. % | |
| 66 | 0 | 0 | 100 | 0 | <1 |
| 67 | 0 | 0 | 0 | 100 | <1 |
| 68 | 0 | 3 | 97 | 0 | <1 |
| 69 | 0 | 3 | 67 | 30 | <1 |
| 70 | 3 | 0 | 67 | 30 | CNS |

These results show that XMNA graft copolymer prepared from low density polyethylene and blended into low density polyethylene or a mixture of low density polyethylene and polyisobutylene has no adhesion to nylon. Furthermore, there is no enhancement of adhesion as a result of the polyisobutylene. In comparison, when XMNA graft copolymer based on high density polyethylene is blended with a mixture of polyisobutylene and low density polyethylene, a remarkable enhancement of adhesion is obtained. These examples further illustrate that specific combinations of materials are required to obtain the superior adhesion of this invention.

EXAMPLES 71–73

NBDA, a fused ring anhydride, is reacted with high density polyethylene homopolymer in a twin-screw extruder to give a graft copolymer resin with 3.3 wt.% NBDA incorporation and a melt index of 0.16 g/10 min. The graft copolymer is blended with a high density polyethylene whose melt index is 0.8 g/10 min. and whose density is 0.96 g/cc. The same graft copolymer is blended with a mixture of polyisobutylene and the high density polyethylene described above. The adhesion of the blends to nylon 6 film was tested according to the procedure described earlier (APT) with the following results.

TABLE XVI

| Exam. No. | Blend Compositions | | | Adhesion to Nylon 6 No. of Wts. 1/16" strip |
|---|---|---|---|---|
| | Graft Copolymer Wt. % | HDPE Wt. % | Polyisobutylene Wt. % | |
| 71 | 0 | 100 | 0 | <1 |
| 72 | 0 | 0 | 100 | <1 |
| 73 | 3 | 67 | 30 | CNS |

This example shows the remarkable adhesion obtained when a fused ring anhydride graft copolymer based on high density polyethylene, polyisobutylene and high density polyethylene are blended.

EXAMPLES 74–85

XMNA is reacted with a high density polyethylene homopolymer in a twin-screw extruder to give a graft copolymer resin with 1.0 wt.% XMNA incorporation and a melt index of 0.8 g/10 min. The above grafted copolymer is blended with various polyethylenes and mixtures of polyethylenes with varying proportions of Vistanex L-120 (a polyisobutylene from Exxon Corporation). These blends were compared with similar blends in which the fused ring anhydride graft of this invention was replaced by several acrylic acid grafted polyolefins as described in the table below.

As shown by the table, surprisingly, the adhesion of the blends containing the fused ring anhydride XMNA graft copolymer is remarkably and unexpectedly better than that of the blends containing acrylic acid graft copolymers. Even though acrylic acid graft copolymers are taught to be effective in the prior art, these examples clearly demonstrate the superiority of the fused ring anhydride graft copolymers. Unexpectedly, acrylic acid graft copolymers are not effective in this invention. Not all grafted copolymers are equivalent in producing effective blends for adhesion to a typical substrate in this invention.

TABLE XVII
SUMMARY OF ADHESION OF POLYOLEFIN GRAFTS/POLYETHYLENE/RUBBER BLENDS OF THE ABOVE EXAMPLES 74–85

| Exam. No. | Graft | Wt. % | PE I[1] | PE II[2] | PE III[3] | Vistanex L-120[4] | Peel Adhesion[5] to nylon 1/16" strip |
|---|---|---|---|---|---|---|---|
| 74 | PEgXMNA[6] | 3.0 | 67.9 | — | — | 29.1 | CNS[7] |
| 75 | Dexon 1001[8] | 3.0 | 67.9 | — | — | 29.1 | <1 |
| 76 | PEgXMNA | 30.0 | — | 40 | — | 30.0 | CNS |
| 77 | Dexon 1001 | 30.0 | — | 40 | — | 30.0 | 3 |
| 78 | PEgXMNA | 3.0 | — | 87 | — | 10.0 | 9 |
| 79 | Dexon 1001 | 3.0 | — | 87 | — | 10.0 | <1 |
| 80 | PEgXMNA | 30.0 | — | 60 | — | 10.0 | CNS |
| 81 | Dexon 1001 | 30.0 | — | 60 | — | 10.0 | <1 |
| 82 | PEgXMNA | 5.0 | — | — | 95 | — | 11 |
| 83 | Dexon 2000[9] | 5.0 | — | — | 95 | — | <1 |
| 84 | PEgXMNA | 5.0 | — | — | 65 | 30.0 | CNS |
| 85 | Dexon 2000 | 5.0 | — | — | 65 | 30.0 | <1 |

NOTES
[1] PE I — ethylene-hexene-copolymer, HLMI = 13, density = 0.954
[2] PE II — polyethylene homopolymer, MI = 0.8, density = 0.96
[3] PE III — polyethylene homopolymer, MI = 0.2, density = 0.96
[4] Vistanex L-120 = polyisobutylene from Exxon
[5] Peel Adhesion = number of 50 gm wts. to peel nylon 6 from test blends (ATP)
[6] PEgXMNA = polyethylene grafted with x-methylbicyclo(2.2.1)hept-5-ene-2,3-dicarboxylic anhydride, MI = 0.8, anhydride = 1.0%
[7] Cannot Separate
[8] Dexon 1001 = commercial Exxon polypropylene grafted with 6% acrylic acid, MFR = 50
[9] Dexon 2000 = commercial Exxon polyethylene grafted with 1% acrylic acid, MI = 0.2

All parts and percentages herein are by weight.
A summarizing list of the abbreviations used herein is as follows:
APT—adhesion press test
BODA—bicyclo(2.2.2)oct-5-ene-2,3-dicarboxylic acid anhydride
CNS—could not separate
DBM—dibutyl maleate
EVA—ethylene-vinyl acetate copolymer
4-MTHPA-4-methylcyclohex-4-ene-1,2-dicarboxylic acid anhydride
HDPE—high density polyethylene
HLMI—high load melt index
LDPE—low density polyethylene
M-PA—maleo-pimaric acid
NBDA—bicyclo(2.2.1)hept-5-ene-2,3-dicarboxylic acid anhydride
XMNA—x-methylbicyclo(2.2.1)hept-5-ene-2,3-dicarboxylic acid anhydride Having described our invention as related to the embodiments set out herein, it is our intention that the invention be not limited by any of the details of description, unless otherwise specified, but rather be construed broadly within its spirit and scope as set out in the appended claims.

We claim:
1. A method of making a composite structure comprising the step of adhering a modified polyolefin blend to a solid substrate, said polyolefin blend consisting essentially of:
- (A) about 0.1-95 parts by weight in said blend of a graft copolymer of about 70-99.999 wt.% of a high density polyethylene backbone grafted with about 30-0.001 wt.% of x-methylbicyclo(2.2.1)hept-5-ene-2,3-dicarboxylic acid anhydride blended with both
- (B) at least one elastomer of the class consisting of homopolymers of isobutylene, copolymers of isobutylene, homopolymers of chloroprene, copolymers of a diene and a vinyl aromatic compound, block copolymers of diene and a vinyl aromatic compound, copolymers of a hydrogenated diene and a vinyl aromatic compound, hydrogenated block copolymers of a diene and a vinyl aromatic compound, homopolymers of butadiene, and a copolymer of an ethylenically unsaturated nitrile and a diene, and
- (C) at least one polyolefin resin of the class consisting of homopolymers of ethylene, copolymers of ethylene and an ethylenically unsaturated ester, and copolymers of ethylene and alpha-olefin.

2. The method of claim 1 wherein said (B) comprises polyisobutylene and (C) comprises high density polyethylene.

3. The method of claim 1 wherein said (C) comprises polyethylene and (B) comprises chlorinated butyl rubber.

4. The method of claim 1 wherein said (C) comprises polyethylene and (B) comprises neoprene.

5. The method of claim 1 wherein said (C) comprises polyethylene and (B) comprises a styrene-isoprene block copolymer in which the isoprene is substantially completely hydrogenated.

6. The method of claim 1 wherein said blend is adhered to said substrate by a method selected from the group consisting of lamination, extrusion coating, coextrusion, powder coating, and blow molding.

7. A method of making a composite structure comprising the step of adhering a modified polyolefin blend to a solid substrate, said polyolefin blend consisting essentially of:
- (A) about 0.1-95 parts by weight in said blend of a graft copolymer of about 70-99.999 wt.% of a high density polyethylene backbone grafted with about 30-0.001 wt.% of bicyclo(2.2.1)hept-5-ene-2,3-dicarboxylic acid anhydride blended with both
- (B) at least one elastomer of the class consisting of homopolymers of isobutylene, copolymers of isobutylene, homopolymers of chloroprene, copolymers of a diene and a vinyl aromatic compound, block copolymers of a diene and a vinyl aromatic compound, copolymers of a hydrogenated diene and a vinyl aromatic compound, hydrogenated block copolymers of a diene and a vinyl aromatic compound, homopolymers of butadiene, and a copolymer of an ethylenically unsaturated nitrile and diene, and
- (C) at least one polyolefin resin of the class consisting of homopolymers of ethylene, copolymers of ethylene and an ethylenically unsaturated ester, and copolymers of ethylene and alpha-olefin.

8. The method of claim 7 wherein said (B) comprises polyisobutylene and said (C) comprises high density polyethylene.

9. The method of claim 7 wherein said blend is adhered to said substrate by a method selected from the group consisting of lamination, extrusion coating, coextrusion, powder coating, and blow molding.

10. A method of making a composite structure comprising the step of adhering a modified polyolefin blend to a solid substrate, said polyolefin blend consisting essentially of:
- (A) about 0.1-95 parts by weight in said blend of a graft copolymer of about 70-99.999 wt.% of a high density polyethylene backbone grafted with about 30-0.001 wt.% of x-methylbicyclo(2.2.1)hept-5-ene-2,3-dicarboxylic acid anhydride blended with both
- (B) polyisobutylene and
- (C) ethylene-vinyl acetate copolymer.

11. The method of claim 10 wherein said blend is adhered to said substrate by a method selected from the group consisting of lamination, extrusion coating, coextrusion, powder coating, and blow molding.

12. A method of making a composite structure comprising the step of adhering a modified polyolefin blend to a solid substrate, said polyolefin blend consisting essentially of:
- (A) about 0.1-95 parts by weight in said blend of a graft copolymer of about 7-99.999 wt.% of a high density polyethylene backbone grafted with about 30-0.001 wt.% x-methylbicyclo(2.2.1)hept-5ene-2,3-dicarboxylic acid anhydride blended with
- (B) polyisobutylene and
- (C) low density polyethylene.

13. The method of claim 12 wherein said blend is adhered to said substrate by a method selected from the group consisting of lamination, extrusion coating, coextrusion, powder coating, and blow molding.

14. A method of making a composite structure comprising the step of adhering a modified polyolefin blend to a solid substrate, said polyolefin blend consisting essentially of:
- (A) about 0.1-95 parts by weight in said blend of a graft copolymer of about 7-99.999 wt.% of a high density polyethylene backbone grafted with about 30-0.001 wt.% of x-methylbicyclo(2.2.1)hept-5-ene-2,3-dicarboxylic acid anhydride blended with
- (B) a hydrogenated block copolymer of a diene and vinyl aromatic compound, and
- (C) at least one polyolefin resin of the class consisting of homopolymers of ethylene, copolymers of ethylene and an ethylenically unsaturated ester, and copolymers of ethylene and alpha-olefin.

15. The method of claim 14 wherein said (C) comprises high density polyethylene.

16. The method of claim 14 wherein said blend is adhered to said substrate by a method selected from the group consisting of lamination, extrusion coating, coextrusion, powder coating, and blow molding.

* * * * *